Dec. 24, 1968  L. LIENARD  3,417,780

BRANCHING DEVICE FOR FLUID DISTRIBUTION

Filed Oct. 27, 1965

INVENTOR
Léonce Lienard
by McDougall, Hersh & Scott
Attys

United States Patent Office 3,417,780
Patented Dec. 24, 1968

3,417,780
BRANCHING DEVICE FOR FLUID
DISTRIBUTION
Leonce Lienard, Bazainville, Yvelines, France
Filed Oct. 27, 1965, Ser. No. 505,334
Claims priority, application France, Nov. 13, 1964,
994,858
1 Claim. (Cl. 137—608)

ABSTRACT OF THE DISCLOSURE

A device for distributing fluid from a main conduit comprising a pair of flanged sections defining opposed semi-cylindrical interior surfaces whereby the flanged sections can be fit around and secured relative to the conduit. One of the flanged sections carries a nipple which extends through an opening in the side wall of the conduit. The nipple is frusto-conical in shape so that it can be wedged into position to provide a tight seal. A passage is defined by the nipple for communication with a tap so that fluid can be withdrawn from the main conduit and discharged from the passage.

---

This invention relates to a fluid distribution system and it relates more particularly to a tap which may be installed to extend below the surface of the earth for bleeding off water or other fluid from a main feeder line to humidify roots of plants and the like.

It is an object of this invention to produce a fluid distribution system and means for bleeding off water or other fluid from a main feeder line for distribution and particularly for sub-soil humidification for the roots of plants, trees, grass and the like, or for ridding the soil of rodents such as field mice or moles, or for the introduction of fertilizer or disinfectant materials, and it is a related object to produce a tap for a main feeder line which can be used interchangeably for liquid distribution below the surface of the soil or for the introduction of gases for the destruction of rodents or for the introduction of fertilizer or disinfectant products.

Figure 1:
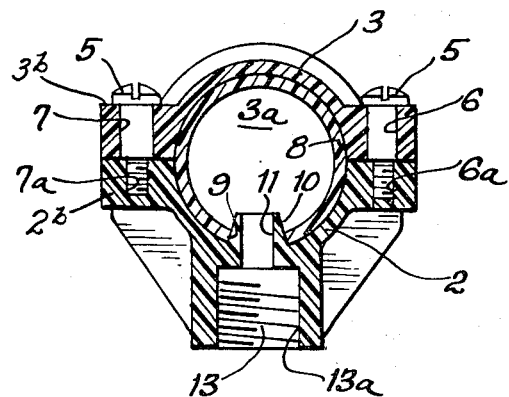
Figure 2:
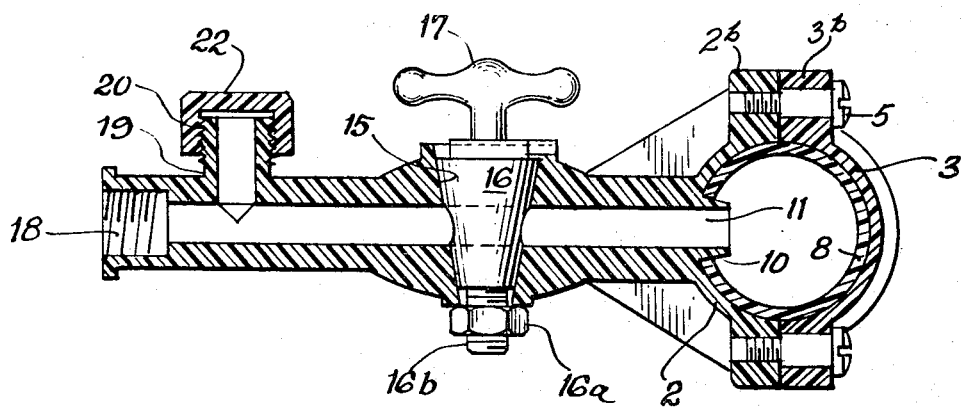

These and other objects and advantages of this invention will hereinafter appear and for purposes of illustration, but not of limitation, an embodiment of the invention is shown in the accompanying drawing in which:

FIG. 1 is a sectional elevation view of a tap embodying the features of this invention, and FIG. 2 is a sectional elevational view of a modification in the construction of a tap embodying the features of this invention.

Referring to FIG. 1 of the drawing, illustration is made of a tap formed of a pair of interfitting sections 2 and 3 which, when joined together in their assembled relationship, define a cylindrical passage 3ª therebetween for the extension of a tubular conduit 8 therethrough.

For this purpose, each of the sections 2 and 3 are formed with diametrically opposed flanged sections 2ᵇ and 3ᵇ having aligned openings. The openings 6 and 7 in the flanged sections 3ᵇ are formed with smooth walls and of a larger dimension than the corresponding openings 6ª and 7ª in the flanged portions of the inner section 2. This enables passage of securing bolts 5 through the openings in the outer section 3 for threaded engagement with the threaded openings 6ª and 7ª of the inner section for securing the sections 2 and 3 together in their assembled relation.

Extending inwardly through the cylindrical passage 3ª is a nipple 10 having a bore 11 which extends therethrough to communicate with a branch passage 13 through the inner section 2. The outer end of said branch passage is tapped to provide screw threads 13ª for threaded engagement with a distribution conduit which may have its outer end buried beneath the surface of the soil for purposes of wetting the soil adjacent the roots of plants and the like. The nipple 10 is adapted to extend through the main conduit 8 for communicating the interior of the cylindrical passage 3ª with the branch passage 13 and for this purpose, said conduit 8 is provided with an opening 9 dimensioned to enable the nipple to be displaced therethrough.

In practice, the sections 2 and 3 may be formed of a relatively rigid material such as of metal. They are, however, preferably molded from synthetic resinous plastic, with or without filler or fibrous reinforcement. The main conduit 8 is preferably formed of a flexible mateial such as of rubber or elastomeric tubing but it can be formed of metal tubing or hose and the like.

The nipple 10 is preferably formed to frusto-conical shape with the end of smaller dimension extending outwardly into the passage 3ª. The openings through the conduit 8 is smaller in diameter than the base portion of the nipple so that the base portion will be resiliently engaged by the conduit to effect a better sealing relationship therebetween.

In the modification illustrated in FIG. 2, the body portion 12 of the mating section 2 is elongated by the extension 14.

Intermediate the nipple 10, at one end, and the threaded outlet 18 at the other end, the interconnecting passage 11 is provided with a means selectively to block off the passage. The blocking means comprises a stop cock 16 rotatably mounted within a conically shaped crosswise frusto-conical opening 15 in the extension with a crosswise passage through the stop cock adapted to communicate one end of the passage 11 with the other when in open position and to seal off the passage 11 when in closed position with the passage in the stop cock extending crosswise of the passage 11 through the extension. A lock nut 16ª is threadably received on a threaded end portion 16ᵇ which extends beyond the opening 15 releasably to secure the stop cock in the assembly. A handle 17 is provided on the other end of the stop cock for manual rotation of the stop cock between open and closed positions.

In addition to the outlet opening 18, the portion of the extension 14 beyond the stop cock 16 is provided with a branched passage 19 having a nipple 20 which is outwardly threaded for joinder with a conduit through which fluid can be introduced into the passage 11 or from which fluid may be bled from said passage.

In use, with the stop cock in open position, fluid such as water flowing through the passage 11 can be dispensed through the two separate openings 18 and 19 for distribution to humidify different parts of the soil. If desired, a cap 22 can be threaded onto the nipple 20 to seal off the opening thereby to provide for but a single outlet, as in the modification shown in FIG. 1. The stop cock 16 can be adjusted between open and closed position to adjust the rate of flow of fluid therethrough.

Instead, the device may be employed with the stop cock 16 in closed position to seal off the main conduit 8. Under such circumstances, the nipple 20 can be joined to a conduit for introduction of gases under pressure for flow outwardly through the outlet 18 into the sub-soil. Beneficial use can be made of the device for the introduction of fluids or gases to kill rodents, such as field mice, moles, and the like, or for introduction of fluids or gases to fertilize or disinfect the soil as by the introduction of nitrogen containing gases or gaseous disinfectants.

It will be understood that numerous changes and modifications may be made in the details of construction, arrangement and operation of the device without departing from the spirit of the invention, especially as defined in the following claim.

I claim:
1. A device for the distribution of fluid from a main conduit comprising a pair of flanged sections having semi-cylindrical concave cavities adapted to define a cylindrical interior configuration therebetween and dimensioned to correspond to the exterior configuration of the main conduit to enable the conduit to extend continuously therethrough, the flanges of the respective sections defining mating surfaces located in substantially the same plane as the axis of said conduits, bolts extending into the adjoining flanges for tightly securing the sections one to the other in an assembled relationship, a nipple on one of the sections, a passage extending continuously through said one section and through the nipple, an opening in a portion of the conduit communicating the cylindrical passage defined by the interior of the conduit with the exterior of the conduit, said opening being dimensioned to enable the nipple to extend therethrough in fitting relationship for communicating said cylindrical passage of the conduit with the passage extending through said one section, said nipple extending radially into the cavity beyond the interior surface defined by said cylindrical passage, said nipple being tapered to frusto-conical shape, said main conduit being formed of flexible material and the base of said nipple being larger than said opening whereby securing of said flanged sections together will result in sealing relationship between the base of said nipple and said main conduit, the passage defined by said one section being located in an elongated pipe which is formed in one piece with the flanged section of said one section, a blocking means attached to said pipe intermediate the ends thereof, said blocking means comprising a stop cock adapted to block said passage when in one position of adjustment and to open said passage when in another position of adjustment, and means for actuating said stop cock between open and closed positions, an outlet tap at the end of said pipe for connection of an additional conduit, and a branch passage in said pipe between said stop cock and said outlet tap, means for attachment of a further conduit to said branch passage, and means for blocking said branch passage.

References Cited

UNITED STATES PATENTS

| | | | |
|---|---|---|---|
| 45,964 | 1/1865 | Ball | 285—197 |
| 2,239,651 | 4/1941 | McMurray et al. | 285—197 |
| 2,512,009 | 6/1950 | Bober | 285—197 |
| 2,569,432 | 9/1951 | Halford | 161—7 |
| 2,598,961 | 6/1952 | Andrus | 137—608 |
| 2,975,983 | 3/1961 | Niebling | 137—608 X |
| 3,032,069 | 5/1962 | Ficklin | 137—315 X |
| 3,284,109 | 11/1966 | Parker | 285—197 |

FOREIGN PATENTS

| | | |
|---|---|---|
| 625,461 | 8/1961 | Canada. |
| 1,212,428 | 10/1959 | France. |

M. CARY NELSON, *Primary Examiner.*

ROBERT C. MILLER, *Assistant Examiner.*

U.S. Cl. X.R.

251—146